US012737517B2

(12) United States Patent
Li

(10) Patent No.: US 12,737,517 B2
(45) Date of Patent: Sep. 15, 2026

(54) CHIP DESIGN METHOD USING SECONDARY DEVELOPMENT CAPABILITY OF EDA SOFTWARE

(71) Applicant: BATELAB CO., LTD., Suzhou (CN)

(72) Inventor: Zhen Li, Suzhou (CN)

(73) Assignee: BATELAB CO., LTD., Suzhou (CN)

( * ) Notice: Subject to any disclaimer, the term of this patent is extended or adjusted under 35 U.S.C. 154(b) by 778 days.

(21) Appl. No.: 18/034,300

(22) PCT Filed: Jun. 1, 2022

(86) PCT No.: PCT/CN2022/096633
§ 371 (c)(1),
(2) Date: Apr. 27, 2023

(87) PCT Pub. No.: WO2023/273779
PCT Pub. Date: Jan. 5, 2023

(65) Prior Publication Data
US 2023/0385491 A1 Nov. 30, 2023

(30) Foreign Application Priority Data
Jul. 2, 2021 (CN) ......................... 202110748503.7

(51) Int. Cl.
*G06F 30/31* (2020.01)
*G06F 8/20* (2018.01)
(Continued)

(52) U.S. Cl.
CPC ................ *G06F 30/31* (2020.01); *G06F 8/20* (2013.01); *G06F 8/77* (2013.01); *G06F 30/373* (2020.01);
(Continued)

(58) Field of Classification Search
CPC .... G06F 30/31; G06F 30/3308; G06F 30/337; G06F 30/367; G06F 30/373;
(Continued)

(56) References Cited

U.S. PATENT DOCUMENTS 6,992,894 B1 * 1/2006 Mease .................. H05K 9/0016 361/799
7,472,363 B1 * 12/2008 Chandra ................ G06F 30/23 716/138
(Continued)

FOREIGN PATENT DOCUMENTS

CN 107330173 A 11/2017
CN 107784179 A 3/2018
(Continued)

OTHER PUBLICATIONS

Peterson, "Learning Hub: PCB Design, EMI from Capacitor Heatsinks and What You Can Do About It", Altium Pty, Ltd, , Dec. 10, 2019, 6 pages. (Year: 2019).*
(Continued)

*Primary Examiner* — Phallaka Kik
(74) *Attorney, Agent, or Firm* — Rimon Law, P.C.

(57) ABSTRACT

The present application discloses a chip design method using secondary development capability of EDA software. On the basis of a chip having design and verification of a main function being completed, the feature steps comprise: customizing and adding, on an EDA software development platform, parameters required for an operating environment corresponding to the chip, automatically adding a schematic diagram of at least one of an environmental stabilization system used for implementing temperature compensation and an environmental stabilization system used for implementing electromagnetic shielding, combining same with a chip schematic diagram and drawing to obtain a layout. According to the method, the optimization operation of
(Continued)

adding an environmental stabilization system is separated from design of the main function of the chip, and on the basis that design and verification of the main function of the chip are completed and the original chip design layout is kept with few changes, the secondary development capability of EDA software is used for separately optimizing and automatically adding the environmental stabilization system to the original chip design layout; thus, the difficulty and time consumption in chip design are reduced to the greatest extent, and the chip can obtain the capability of normally implementing functions in temperatures and electromagnetic environments that are more severe than those expected in the original design.

9 Claims, 5 Drawing Sheets

(51) Int. Cl.
*G06F 8/77* (2018.01)
*G06F 30/3308* (2020.01)
*G06F 30/337* (2020.01)
*G06F 30/367* (2020.01)
*G06F 30/373* (2020.01)
*G06F 30/398* (2020.01)
*G06F 119/02* (2020.01)
*G06F 119/06* (2020.01)
*G06F 119/08* (2020.01)
*G06F 119/18* (2020.01)

(52) U.S. Cl.
CPC ........ *G06F 30/3308* (2020.01); *G06F 30/337* (2020.01); *G06F 30/367* (2020.01); *G06F 30/398* (2020.01); *G06F 2119/02* (2020.01); *G06F 2119/06* (2020.01); *G06F 2119/08* (2020.01); *G06F 2119/18* (2020.01)

(58) Field of Classification Search
CPC . G06F 30/398; G06F 8/20; G06F 8/77; G06F 2119/08; G06F 2119/02; G06F 2119/06; G06F 2119/18
USPC ..... 716/132, 106, 111, 136, 102, 54; 703/14
See application file for complete search history.

(56) References Cited

U.S. PATENT DOCUMENTS 10,879,202 B1 * 12/2020 Lewandowski ......... G06F 7/381
11,775,119 B1 * 10/2023 Song ....................... G06F 3/044 361/749
2003/0156400 A1 * 8/2003 Dibene, II ........... H05K 7/1092 257/E23.09
2007/0081888 A1 * 4/2007 Harrison .............. H05K 7/2019 257/E23.099
2008/0215907 A1 * 9/2008 Wilson .................. H03L 7/1974 713/500
2009/0019411 A1 1/2009 Chandra et al.
2009/0195953 A1 * 8/2009 Chen ....................... G05F 1/573 361/87
2012/0224329 A1 * 9/2012 Li ......................... G06F 1/1656 361/720
2013/0212544 A1 * 8/2013 Yu ........................... G06F 30/30 716/112
2014/0101626 A1 * 4/2014 Yu ........................... G06F 30/30 716/102
2015/0043161 A1 * 2/2015 Nelson .................... G06F 1/203 361/679.54
2017/0103146 A1 * 4/2017 Baumgartner .......... G06F 30/20
2018/0204783 A1 * 7/2018 Han ...................... H10W 40/73
2020/0065451 A1 * 2/2020 Yu Tseng ............. H10D 84/834
2020/0135514 A1 * 4/2020 Tseng .................... G06F 30/367
2020/0159978 A1 5/2020 Pan et al.
2021/0082833 A1 3/2021 Jin et al.
2021/0368659 A1 * 11/2021 Strader .................... C08K 3/22
2021/0384054 A1 * 12/2021 Tseng .................... G06F 30/367
2022/0404878 A1 * 12/2022 Khasgiwala ............ G06F 1/206
2023/0025017 A1 * 1/2023 Xie ..................... G06F 13/4282

FOREIGN PATENT DOCUMENTS

CN 111856653 A 10/2020
CN 112507657 A 3/2021
CN 212873293 U 4/2021
CN 113204936 A 8/2021
CN 107342279 A 11/2021
EP 3059685 A1 * 8/2016 ........... H05K 3/0005
JP 6110447 B2 * 4/2017 ........... H05K 3/0005
WO WO-2007070879 A1 * 6/2007 ......... G06F 17/5009

OTHER PUBLICATIONS

Lee et al., Korean Patent Document No. KR2017062774A, , published Jun. 8, 2017, 3 pages including abstract, claims and 1 drawing. (Year: 2017).*
Zhou, Chinese Patent Document No. CN-103033669-A, published Apr. 10, 2013, 3 pages including abstract, claims and 1 drawing. (Year: 2013).*
First Office Action with English Translation for Application No. CN 202110748503.7, dated Aug. 1, 20212; 11 pages.
First Office Action with English Translation for Application No. JP 2023526359, dated Apr. 2, 2024; 4 pages.

* cited by examiner

CHIP DESIGN METHOD USING SECONDARY DEVELOPMENT CAPABILITY OF EDA SOFTWARE

CROSS-REFERENCE TO RELATED APPLICATIONS

This application is a national stage of International Application No. PCT/CN2022/096633, filed on Jun. 1, 2022, and claims priority to a Chinese patent application filed in the Patent Office of China on Jul. 2, 2021, with the application number of 202110748503.7 and the invention title of "Chip Design Method for Automatically Adding Environmental Stabilization System", the entire contents of which are incorporated herein by reference.

TECHNICAL FIELD

The present application relates to a semiconductor chip design method, and in particular to a chip design technical solution utilizing secondary development capability of EDA software according to input chip operating environment conditions.

BACKGROUND

With the rapid development of intelligent terminal devices, from data adapters and Bluetooth headsets to control systems of cars, ships and airplanes, semiconductor chips with high precision design and processing are indispensable. With the diversity of products and different environments to which the chip is applied, higher requirements are put forward for the environmental tolerance of chip operation. Usually, the temperature range of stable operation is considered and set at the beginning of functional design of chips in electronic products. However, electronic products migrate with users at different latitudes of the earth, and when they enter extremely cold areas, their performance often decreases greatly Similar to batteries, semiconductor substrates will crash after the temperature drops to a certain lower limit.

In general, chip design is divided into a consumer grade, an industrial grade, a military grade, etc. Different grades have detailed expectations for the operational temperature range of chip. Obviously, it is quite difficult to design chips that directly meet the highest specifications at one time, and the high temperature limit is limited by the temperature limit at which the semiconductor is intrinsic such that the PN junction disappears. However, the low temperature direction is limited by variations in the performance of the semiconductor device itself, which makes the operating point of the circuit deviate from the expectation and leads to failure.

In general, when designing circuits, various temperature conditions are considered for optimization, but at the same time, the design difficulty is increased and the design cycle is prolonged.

Similarly, with the development of radio communication technology and the complexity of the surrounding electromagnetic environment, it also poses a lot of risks to the normal operation of the chip according to the preset functions. If the chip protection is not in place, it will lead to large-scale equipment failure and paralysis after large-scale electromagnetic radiation. Therefore, in the process of chip design, more and more developers pay attention to the technological breakthrough of adding an environmental stabilization system to the chip.

However, in the prior art with respect to the environmental stabilization system of chips, in terms of temperature, a trade-off between temperature range and electrical performance range according to commercial goals is obtained, and this solution requires consideration of temperature characteristics of more devices, making it difficult to design circuits. Alternatively, some heating methods may be designed to allow the chip to operate in a low temperature environment at the time of the principle circuit design. This increases the design difficulty and requires manual involvement in implementing this part of the temperature-compensated circuit in the chip layout at the time of the layout design. At present, electromagnetic shielding is a major concern during packaging and circuit board design, such as the addition of a metal cover during circuit design.

SUMMARY

In order to overcome the above-mentioned shortcomings of the prior art, an objective of the present application is to propose a chip design method using secondary development capability of EDA software, which solves the problem of improving chip resistance to environmental changes and maintaining functional stability in chip design.

The technical solution of the present application to achieve the above objective is a chip design method using secondary development capability of EDA software, on the basis of a chip having design and verification of a main function thereof completed, at least one of an environmental stabilization system used for implementing temperature compensation and an environmental stabilization system used for implementing electromagnetic shielding is automatically added.

Optionally, when automatically adding the environmental stabilization system used for implementing temperature compensation, the method includes:

- step S11, preconfiguring at least one function module corresponding to temperature compensation in an EDA software development platform for chip design;
- step S12, selecting to add temperature compensation on a chip design development platform, and inputting at least one temperature-related parameter which is required for an environment; and
- step S13, automatically calculating, by the EDA software development platform, a heat generation power required for temperature compensation based on the temperature-related parameter which is required for an environment, calling, based on the calculated heat generation power, the function module corresponding to temperature compensation to be added to a completed chip design, and drawing a corresponding schematic diagram and a layout.

Optionally, when automatically adding the environmental stabilization system used for implementing electromagnetic shielding, the method includes:

- step S21, preconfiguring at least one function module corresponding to electromagnetic shielding in an EDA software development platform for chip design, wherein the electromagnetic shielding includes: addition of a metal layer, shielding by grounding;
- step S22, selecting to add electromagnetic shielding on a chip design development platform, and inputting an environment parameter related to electromagnetic field intensity; and
- step S23, automatically calculating, by the EDA software development platform, a width and a thickness of a covering metal layer based on the environmental parameter related to electromagnetic field intensity as well as a frame size and coordinates of a completed chip design, calling the function module corresponding to electromagnetic shielding to be added to the completed chip design based on the calculated width and thickness of the covering metal layer, and drawing a corresponding schematic diagram and a layout.

Optionally, the temperature-related parameter which is required for an environment at least includes: a lower limit of temperature stability point, a chip operating environment temperature, a package heat dissipation speed, and an estimated chip heat generation power.

Optionally, the function module corresponding to temperature compensation includes: a heating control circuit and a heating circuit based on a silicon substrate and resistors, the number, distribution and wiring size of the resistors in the heating circuit are calculated by the EDA software development platform based on a heat generation power of each resistor, and the frame size and coordinates of the completed chip design.

Optionally, the heating control circuit is connected between a power source section and a heating current-limiting module of the completed chip design, and includes a second temperature detection circuit for controlling on-off of the power source section, a first temperature detection circuit for driving and controlling the heating current-limiting module, and a positive temperature coefficient resistor and a negative temperature coefficient resistor which are respectively connected with the first and second temperature detection circuits via signal communication and configured to measure the temperature of the chip, and switching thresholds of output control signals of the first and second temperature detection circuits are adjustably set by the EDA software development platform.

Optionally, in the step S12, inputting at least one temperature-related parameter which is required for the environment includes: removing the frame of the completed chip design, and in the step S13, calling the function module corresponding to temperature compensation to be added to the completed chip design and drawing the corresponding schematic diagram and the layout includes: calculating a safe voltage difference between a peripheral heating circuit and a circuit within the frame that has been removed by the EDA software development platform.

Optionally, the temperature-related parameter which is required for the environment inputted in the step S12 includes: a maximum size limited by chip packaging, and in the step S13, using the maximum size limited by chip packaging as a range constraint by the EDA software development platform to add the function module corresponding to temperature compensation and draw a schematic diagram and a layout.

Optionally, in the step S23, when electromagnetic shielding is done by addition of a metal layer, calling the function module corresponding to electromagnetic shielding to be added to the completed chip design includes:

calculating a thickness of a required metal layer according to the environmental parameter related to electromagnetic field intensity, and in combination with the frame size and coordinates of the completed chip design, obtaining a size and coordinates of a metal layer covering an entire surface of a chip, the metal layer being a polygon; and according to the obtained size and coordinates of the metal layer covering the entire surface of the chip, adding an grounded loop island at a bottom layer around the perimeter of the completed chip design and starting growth until the metal layer is closed at the top so that the completed chip design is completely covered by the metal layer, wherein the metal layer at the top is left with openings at locations corresponding to chip contacts, and each face of the polygonal metal layer is grounded.

Optionally, according to the obtained size and coordinates of the metal layer covering the entire surface of the chip, adding the grounded loop island at the bottom layer around the perimeter of the completed chip design and starting growth until the metal layer is closed at the top so that the completed chip design is completely covered by the metal layer includes:

performing a logical operation extending a certain width for the windows corresponding to the chip contacts and located on the metal layer at the top, so that the metal layer with the openings and covering the entire chip is obtained, wherein the locations and sizes of the openings are one-to-one corresponding to the locations and sizes of the contacts.

Through the chip design method using secondary development capability of EDA software of the present application, significant advances are achieved: according to the method, the optimization operation of adding an environmental stabilization system is separated from design of the main function of the chip, and on the basis that design and verification of the main function of the chip are completed and the original chip design layout is kept with few changes, the secondary development capability of EDA software is used for separately optimizing and automatically adding the environmental stabilization system to the original chip design layout; thus, the difficulty and time consumption in chip design are reduced to the greatest extent, and the chip can obtain the capability of normally implementing functions in temperatures and electromagnetic environments that are more severe than those expected in the original design.

DETAILED DESCRIPTION

Hereinafter, specific embodiments of the present application will be described in further detail with reference to the accompanying drawings, so that the technical solution of the present application can be more easily understood, grasped, and thus the scope of protection of the present application can be more clearly defined.

Designers of the present application address many shortcomings of the prior art in terms of design and specific practices to improve the stable operation ability of the chip to the environment, and relies on the experience of chip design, and innovatively proposes a chip design method for automatically adding an environmental stabilization system. Under the premise of retaining the original chip design, the designers uses the secondary development ability of EDA software platform to automatically add a reasonable and optimized environmental stabilization system to the original chip, and draws a complete schematic diagram and a layout. The chip designed by this method can prevent it from accidental failure, crash and shutdown in various complex and changeable application environments.

Figure 1:
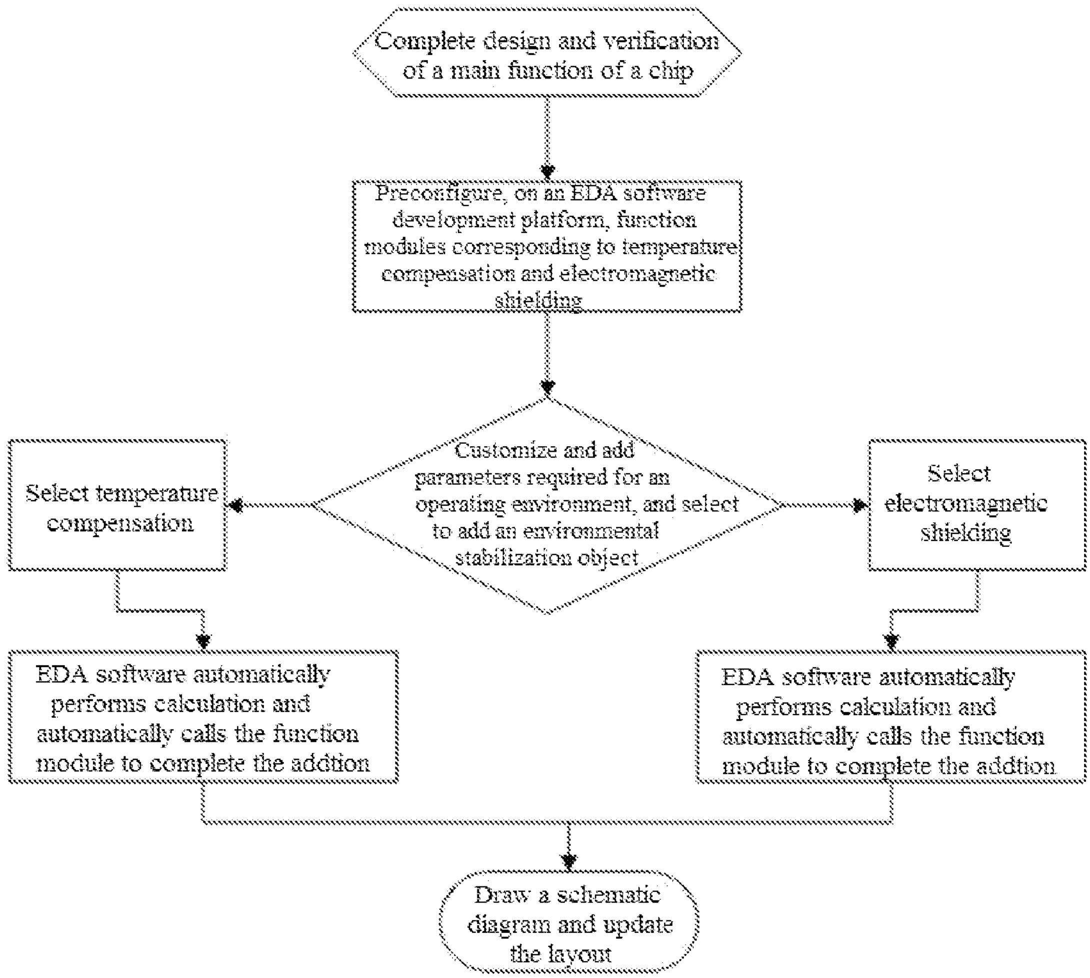
FIG. 1 is a flowchart illustrating an overview of a chip design method using secondary development capability of EDA software according to an embodiment of the present disclosure.

From the overview of the solution as shown in FIG. 1, the above-described chip design method of the present application is implemented based on a software platform of a chip design, and a chip (hereinafter referred to as an original chip) having design and verification of a main function thereof completed is used as a design object. Its innovative feature is to customize and add, on an EDA (Electronic Design Automation) software development platform, parameters required for an operating environment corresponding to the chip, and call the system resources to automatically add the schematic diagram of the environment stabilization system, and combine same with an original chip schematic diagram and draw to obtain a layout. There are many kinds of chip products because of different functional designs, and the environment in which the physically assembled products are used is also diverse, including temperature, humidity, ionizing radiation, mechanical vibration, chemical corrosion, electrostatic field and so on. When certain environmental factors exceed the material loading of the chip itself or cause minor changes in the performance of the parameters of some of its components, the disastrous result of functional failure and even paralyzed self-destruction will occur. For this reason, environmental adaptability to chip design is an important part. However, not all of the environmental factors described above can be targeted to be overcome during chip design. Therefore, the parameters required for an operating environment include, but are not limited to, the operational temperature environment of the chip, the self-heating state, and the electromagnetic field strength. In order to improve the operational stability of the chip in a wide temperature range with a target, it is necessary to increase the temperature adjustability around the original chip; similarly, interference of the surrounding electromagnetic field is overcome by adding a metal layer.

In order to more clearly understand the implementation of the chip design method using secondary development capability of EDA software of the present application, the following is detailed with alternative embodiments.

First, the implementation of an environmental protection measure (i.e., environmental stabilization system) based on temperature compensation includes:

step S11, at least one function module corresponding to temperature compensation is preconfigured in an EDA software development platform for chip design;

step S12, temperature compensation is selected to add on a chip design development platform, and at least one temperature-related parameter which is required for an environment is input; and step S13, a heat generation power required for temperature compensation is automatically calculated by the EDA software development platform based on the temperature-related parameter which is required for an environment, based on the calculated heat generation power, the function module corresponding to temperature compensation is called to be added to a completed chip design, and a corresponding schematic diagram and a layout are drawn.

For a conventional temperature compensation circuit, the main way to realize temperature regulation except the controller is to lay out resistors and supply them with current to make them heat up. However, different from ordinary PCBs or finished devices, adding a temperature compensation circuit in the field of IC chips requires a more detailed circuit design solution, including material selection of a chip substrate, etc. The better purpose needs to realize online automatic design under manual setting goals.

Figure 2:
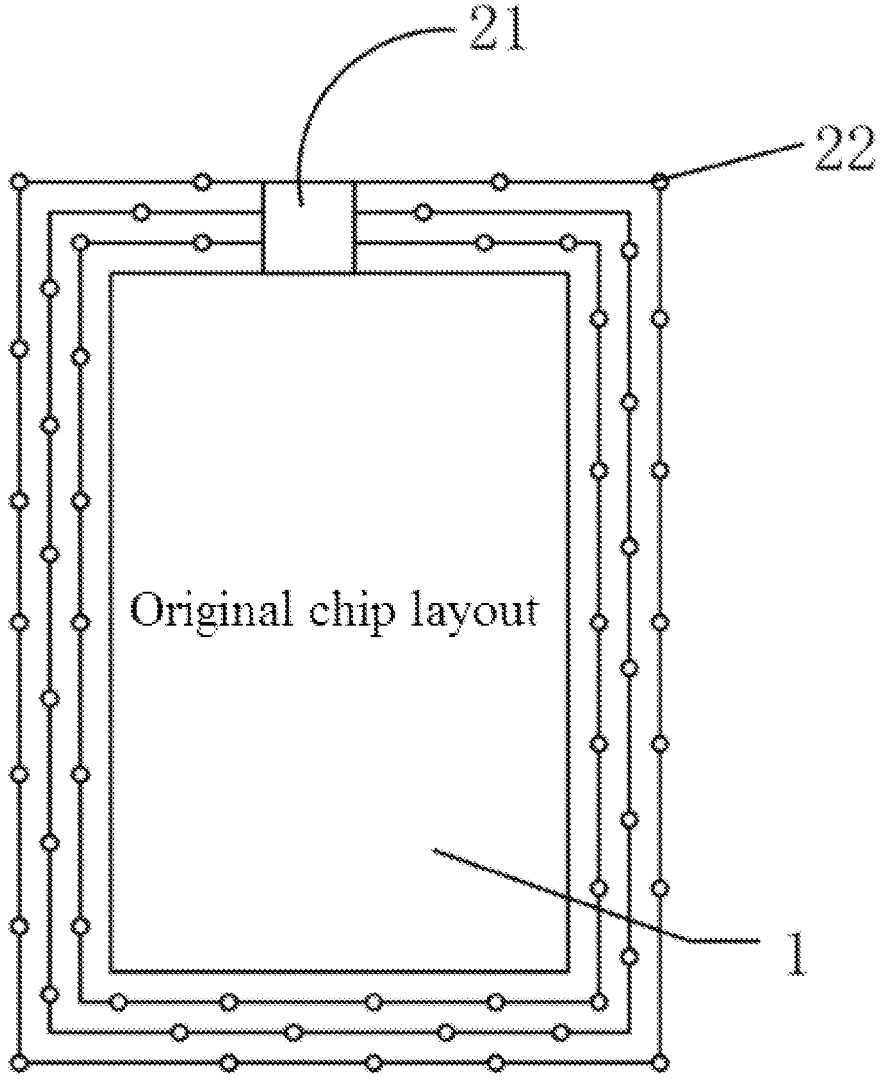
FIG. 2 is a schematic diagram of the chip effect of adding temperature compensation by using the chip design method using secondary development capability of EDA software according to an embodiment of the present disclosure.

High purity silicon has a thermal conductivity of 140 W/mK and is itself a good thermal conductivity material. After adding a chip to a silicon-based fabrication process using this substrate property, the chip can heat itself at a low temperature when energized, thereby enabling some chips originally designed to operate at an ambient temperature of minus 45° C. or above to operate at a lower ambient temperature. There is thus a need to design a temperature compensation circuit that operates at a low ambient temperature, as shown in FIG. 2. The schematic block diagram of the circuit is of course not limited thereto, and the implementation on various chip technologies is versatile. The temperature compensation circuit is derived from a function module pre-added to the development platform, including a heating control circuit 21 (the specific internal circuit structure is shown in FIG. 3) and a heating circuit 22 (or heating loop) based on a silicon substrate and resistors.

Implementation of a temperature compensated design of a chip using an EDA software development platform requires a developer to input temperature-related parameters which are required for an environment, i.e., to make the development platform, which is the subject of the chip design, clear the temperature environment in which the chip is operating stably and the heating state of the chip itself under different loads when it is operating. Thus, the temperature-related parameters which are required for an environment include at least: a lower limit of temperature stability point (e.g., minus 45° C.), a chip operating environment temperature (minus 60° C. to minus 30° C.), a package heat dissipation speed, and an estimated chip heat generation power. On the basis thereof, the development platform can automatically calculate the required heating power according to the original chip specifications, and design the locations and layouts of the heating control circuit and the heating circuit on the basis of the calculated result.

Figure 3:
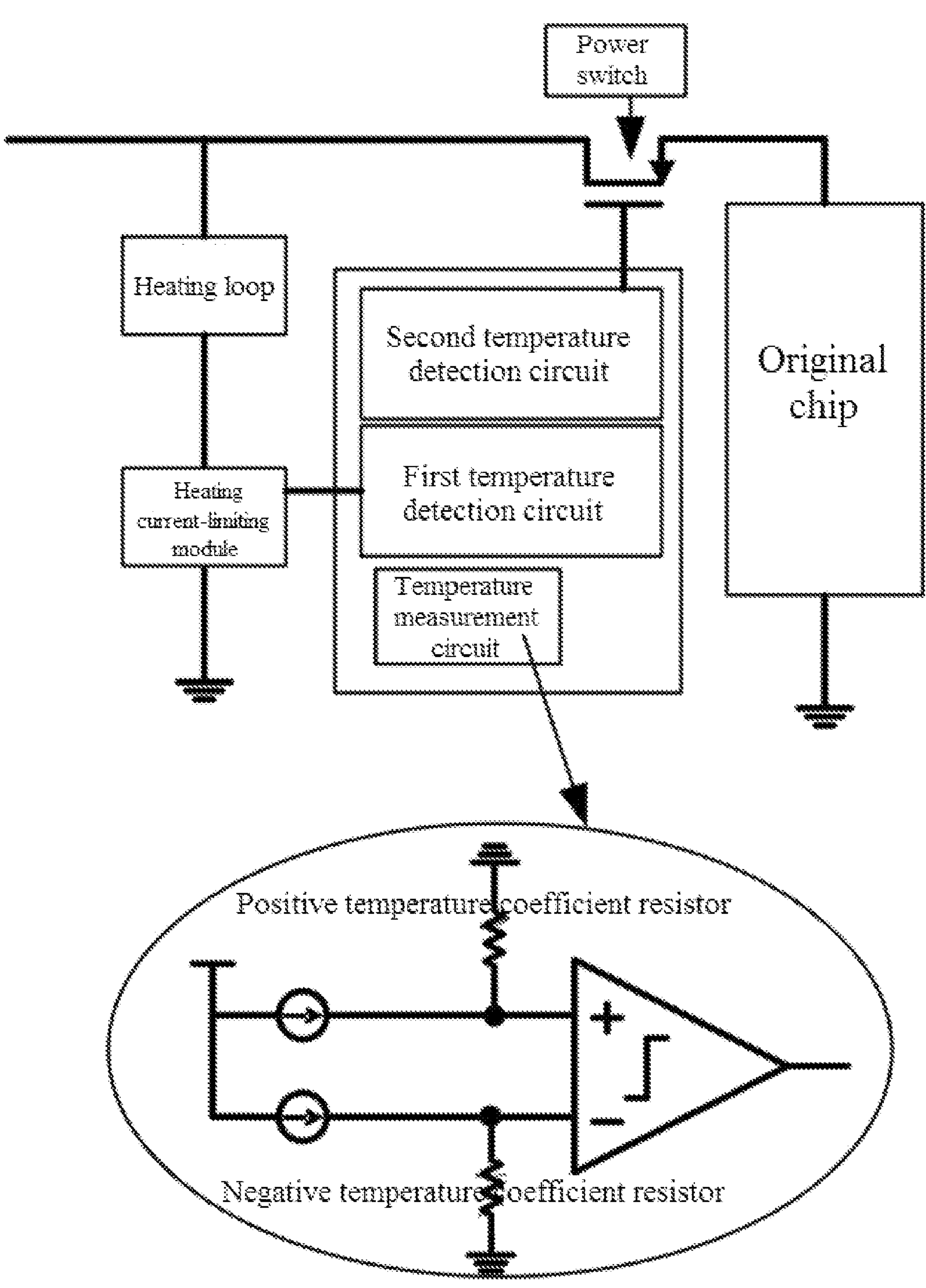
FIG. 3 is a topological schematic diagram of a heating control circuit of FIG. 2.

Referring first to the heating control circuit shown in FIG. 3, which is connected between a power source section and a heating current-limiting module of an original chip, and mainly includes a second temperature detection circuit for controlling on-off of the power source section, a first temperature detection circuit for driving and controlling the heating current-limiting module, and a positive temperature coefficient resistor and a negative temperature coefficient resistor which are respectively connected with the first and second temperature detection circuits via signal communication and configured to measure the temperature of the chip, and switching thresholds of output control signals of the first and second temperature detection circuits are adjustably set by the EDA software development platform. The heating control circuit, as an integral unit, is added near the location of the VIN contact of the original chip and closest to the frame of the original chip. From the circuit details, the second temperature detection circuit is connected with the power switch of the original chip, and the on-off state is switched by signal control. In the embodiment that the previously set minus 45° C. is the lower limit of the temperature stability point, the signal control of the second temperature detection circuit includes the following steps: when the ambient temperature of the power switch is higher than minus 45° C. when the power switch is in an off state, the power switch is turned on to make the original chip operate normally; when the power switch is in an on state, the power switch is turned off when the ambient temperature is as low as minus 50° C., so as to prevent the original chip from running self-destructively at an unreasonable temperature.

In the meantime, the heating control circuit requires signal control to limit current after the heating circuit heats up to a certain upper limit in a continued heating state, i.e., the heat generation amount of the heating circuit requires controllability to avoid other damages to the stable operating state of the chip caused by too high temperature. For example, it is possible to control current limiting, pause heating or reduce heating amplitude when the ambient temperature is higher than minus 23° C. while the heating circuit is continuously operating to heat; when the heating circuit is turned off and the ambient temperature is below minus 40° C., the current limiting can be controlled to be discontinued to achieve temperature compensation.

As can be seen from FIG. 2, the heating circuit 22 is not implemented by a single resistor in the layout, but relies on a series arrangement of a plurality of resistors with conductors to form a heating loop, the resistors being evenly distributed around the outside of the layout of the original chip 1. The resistance of each of these series resistors is the same, and since the series connection leads to a relatively uniform heating power, the original chip is uniformly heated by these resistors. Here, the number, distribution and wiring size of the resistors in the heating circuit are calculated by the EDA software development platform based on a heat generation power of each resistor, and the frame size and coordinates of the completed chip design.

It should be noted that the schematic diagram of the temperature compensation circuit is identical under a specific process, but the layout shapes of all the chips are not completely uniform due to differences in functional design and process of each chip. Thus, the present chip design method adds an enhanced function to the original chip without requiring manual modification of the original chip layout.

The specific process of the layout design of the heating circuit, referring to the codified text description, includes the following steps: 1. obtaining a frame size and coordinates of the original chip; 2. obtaining position coordinates of a VIN contact of the original chip; 3. adding a heating control circuit to a specific position beside the VIN contact; 4. leading a metal wire from the VIN contact to an output point of a power switch of the original chip; 5. calculating the perimeter of the frame of the original chip after adding a certain width; 6. calculating the length and width of the total heating resistors with reference to a heating power demand and a known working voltage; 7. calculating the number of added heating points, dividing the perimeter by 200 μm to get a first quotient, dividing the perimeter by 500 μm to get a second quotient, and taking an integer between the first quotient and the second quotient as the number of heating points, wherein if the integer parts of the first quotient and the second quotient are identical, a value slightly greater than the first quotient is taken so that the number of heating points is, as far as possible, the divisor of the length of the heating resistors divided by the quotient of the process accuracy, and if it cannot be satisfied, one of the resistors is slightly larger or smaller than the others, and the error is less than 10%; 8. uniformly distributing the positions of heating resistors according to the number of heating points, that is, completing distribution by dividing the perimeter by the number of heating points, and adding a new packaging frame on the outside. The above algorithm is not unique. Based on the diversity of the original chip shape and its frame size, as well as the contrast between the power performance of the heating resistors and the rated heating power, the algorithm of the number and layout of the heating resistors is editable and adjustable.

The principle of calculating the length and width of the heating resistor in step 6 above is that, on an integrated circuit layout, the resistor is usually a thin film of a certain thickness, and the direction of energization is from one edge of the film to the other. When the thickness of the film cannot be changed, the resistance value corresponding to the square composed of the film is determined, the width of the film determines the upper limit of the current that can be passed by the resistor, the required resistance value is calculated according to the heating power requirement, and then the length of the film, i.e., the length and width of the heating resistor required, can be determined.

Further, in the step S12, inputting at least one temperature-related parameter which is required for the environment includes: removing the frame of the completed chip design, and in the step S13, when adding the function module and drawing the schematic diagram and the layout, calculating a safe voltage difference between a peripheral heating circuit and a circuit within the frame that has been removed by the EDA software development platform so as to avoid breakdown damage to the internal circuit of the original chip when the peripheral heating circuit operates to heat up. The temperature-related parameter which is required for the environment inputted in the step S12 includes: a maximum size limited by chip packaging, and in the step S13, using the maximum size limited by chip packaging as a range constraint by the EDA software development platform to add the function module corresponding to temperature compensation and draw a schematic diagram and a layout.

Optionally, the above step S12 further provides an option to select heating power, heating circuits of different widths are required to be associated, when the selection power is larger, the heating circuit selectively switched is wider, so that more heat is generated around the chip, and the ability to stably work with larger heat dissipation is obtained.

Furthermore, the means of implementing environmental protection based on electromagnetic shielding (i.e., the environmental stabilization system) include:

- step S21, at least one function module corresponding to electromagnetic shielding is preconfigured in an EDA software development platform for chip design, wherein the electromagnetic shielding includes: addition of a metal layer, shielding by grounding;
- step S22, electromagnetic shielding is selected to be added on a chip design development platform, and at least one environment parameter related to electromagnetic field intensity is input; and
- step S23, a width and a thickness of a covering metal layer are automatically calculated by the EDA software development platform based on the environmental parameter related to electromagnetic field intensity as well as a frame size and coordinates of a completed chip design, the function module corresponding to electromagnetic shielding is called to be added to the completed chip design based on the calculated width and thickness of the covering metal layer, and a corresponding schematic diagram and a layout are drawn.

It is common practice in the field of circuit design to enhance the electromagnetic interference resistance of circuits with the addition of metal shields. However, if we want to use the EDA software development platform to realize automatic design and optimization of electromagnetic shielding ability of the chip, we need developers to input environmental parameters related to electromagnetic field intensity, that is, the development platform, which is the main body of chip design, makes clear the anti-electromagnetic interference ability of the chip under stable operation and the electromagnetic field intensity under current environment, so as to reasonably calculate the specifications and size of the required metal layer shield, and carry out high-precision layout design of position and specifications as well as size.

It should be noted that in the environmental protection means, the metal layer is mainly added on top of the original chip, and the surface of the original chip is covered by an integrally formed polygonal cover. Since the design location and the specifications of the chip on the main control board of the actual product are very compact, it is not possible to construct a barrier against electromagnetic interference at its periphery apart from the original chip.

Figure 4:
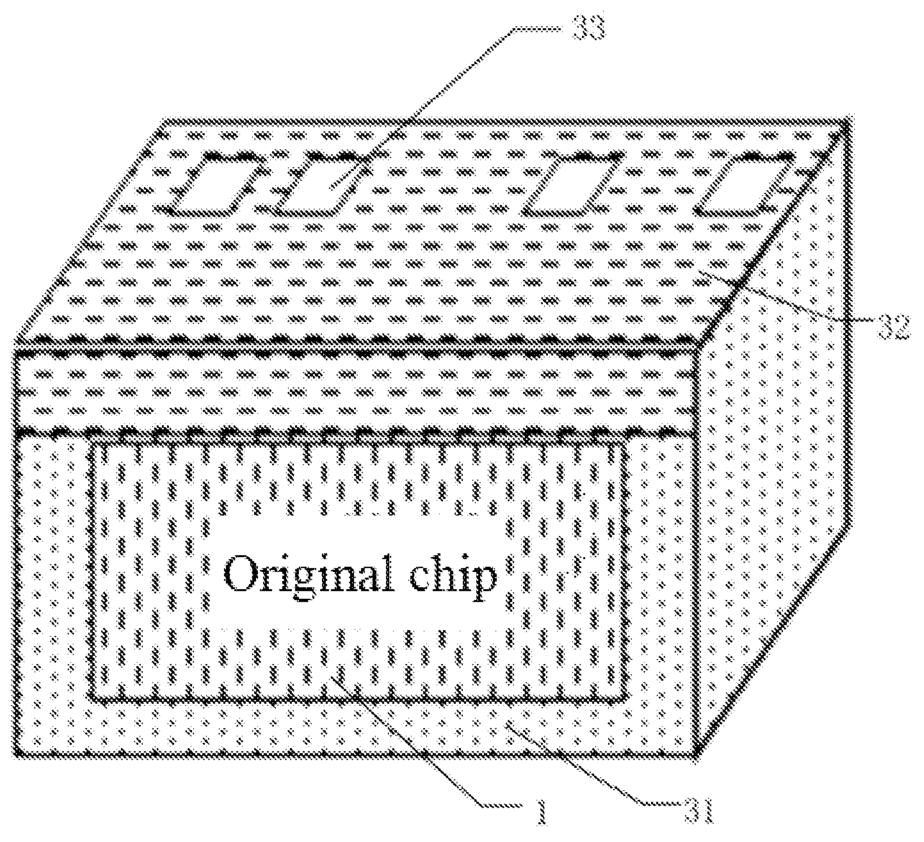
FIG. 4 is a schematic diagram of the chip stereoscopic effect of adding electromagnetic shielding by using the chip design method using secondary development capability of EDA software according to an embodiment of the present disclosure.
Figure 5:
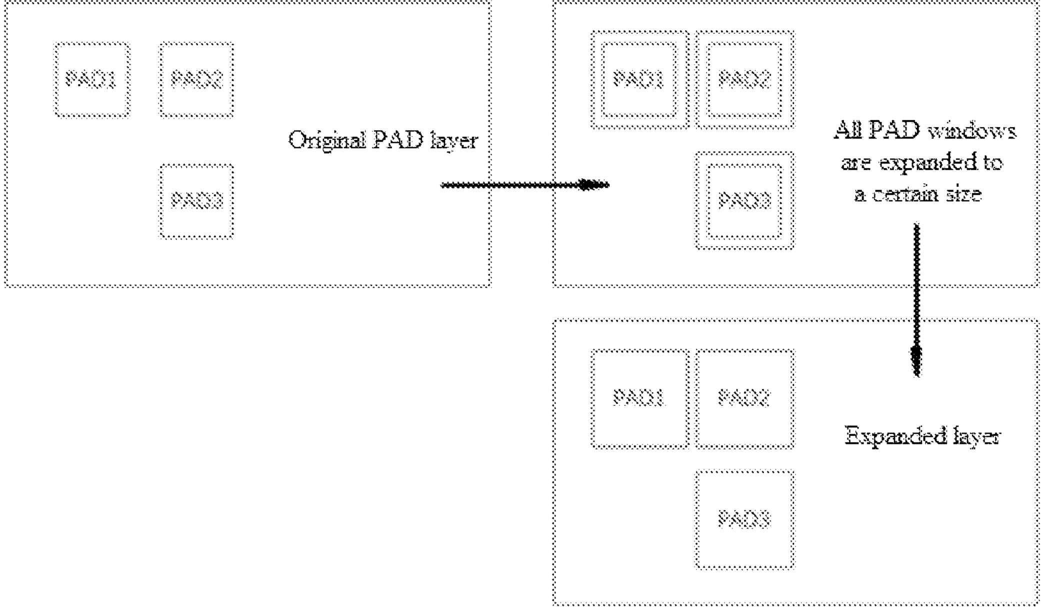
FIG. 5 is a schematic diagram of the formation of windows in a metal layer at the top corresponding to a contact layer of an original chip in an electromagnetic shielding design by using the chip design method using secondary development capability of EDA software according to an embodiment of the present disclosure.

As shown in FIG. 4 and FIG. 5, the sequence of adding the metal layer to the original chip by calling the function module in step S23 is as follows: firstly, the thickness of the required metal layer is calculated according to the environmental parameter, and in combination with the original chip to obtain the frame size and coordinates, and a size and coordinates of a metal polygon covering an entire surface of a chip are obtained. Then, an grounded loop island 31 is added at a bottom layer around the perimeter of the completed chip design and starts growth until the metal layer 32 at the top is completed, and each face of the metal polygon is grounded to end the chip design. A logical operation extending a certain width is performed for the windows corresponding to the chip contacts of the original chip and located on the metal layer 32 at the top, so that the metal layer with the openings 33 and covering the entire original chip is obtained, wherein the positions and sizes of the openings are one-to-one corresponding to the positions and sizes of the contacts.

As can be seen from the detailed description of the illustrated embodiments, through the chip design method using secondary development capability of EDA software of the present application, significant advances are achieved in addition to the outstanding substantial features: according to the method, the optimization operation of adding an environmental stabilization system is separated from design of the main function of the chip, and on the basis that design and verification of the main function of the chip are completed and the original chip design layout is kept with few changes, the secondary development capability of EDA software is used for separately optimizing and automatically adding the environmental stabilization system to the original chip design layout; thus, the difficulty and time consumption in chip design are reduced to the greatest extent, and the chip can obtain the capability of normally implementing functions in temperatures and electromagnetic environments that are more severe than those expected in the original design. The design efficiency to improve performance of a chip has increased dramatically.

In addition to the above-described embodiments, the present disclosure has other embodiments, and equivalents and variations thereof are intended to fall within the scope of the present disclosure.

What is claimed is:

1. A chip design method using secondary development capability of EDA software, on the basis of a chip having design and verification of a main function thereof completed, comprising: automatically adding at least one of an environmental stabilization system used for implementing temperature compensation and an environmental stabilization system used for implementing electromagnetic shielding;

wherein, when automatically adding the environmental stabilization system used for implementing electromagnetic shielding, the method comprises:

step S21, preconfiguring at least one function module corresponding to electromagnetic shielding in an EDA software development platform for chip design, wherein the electromagnetic shielding comprises: addition of a metal layer, shielding by grounding;

step S22, selecting to add electromagnetic shielding on a chip design development platform, and inputting at least one environment parameter related to electromagnetic field intensity; and step S23, automatically calculating, by the EDA software development platform, a width and a thickness of a covering metal layer based on the environmental parameter related to electromagnetic field intensity as well as a frame size and coordinates of a completed chip design, calling the function module corresponding to electromagnetic shielding to be added to the completed chip design based on the calculated width and thickness of the covering metal layer, and drawing a corresponding schematic diagram and a layout.

2. The chip design method using secondary development capability of EDA software according to claim 1, wherein, when automatically adding the environmental stabilization system used for implementing temperature compensation, the method comprises:

step S11, preconfiguring at least one function module corresponding to temperature compensation in an EDA software development platform for chip design;

step S12, selecting to add temperature compensation on a chip design development platform, and inputting at least one temperature-related parameter which is required for an environment; and step S13, automatically calculating, by the EDA software development platform, a heat generation power required for temperature compensation based on the temperature-related parameter which is required for an environment, calling, based on the calculated heat generation power, the function module corresponding to temperature compensation to be added to a completed chip design, and drawing a corresponding schematic diagram and a layout.

3. The chip design method using secondary development capability of EDA software according to claim 2, wherein the temperature-related parameter which is required for an environment at least comprises: a lower limit of temperature stability point, a chip operating environment temperature, a package heat dissipation speed, and an estimated chip heat generation power.

4. The chip design method using secondary development capability of EDA software according to claim 2, wherein the function module corresponding to temperature compensation comprises: a heating control circuit and a heating circuit based on a silicon substrate and resistors, the number, distribution and wiring size of the resistors in the heating circuit are calculated by the EDA software development platform based on a heat generation power of each resistor, and the frame size and coordinates of the completed chip design.

5. The chip design method using secondary development capability of EDA software according to claim 4, wherein the heating control circuit is connected between a power source section and a heating current-limiting module of the completed chip design, and comprises a second temperature detection circuit for controlling on-off of the power source section, a first temperature detection circuit for driving and controlling the heating current-limiting module, and a positive temperature coefficient resistor and a negative temperature coefficient resistor which are respectively connected with the first and second temperature detection circuits via signal communication and configured to measure the temperature of the chip, and switching thresholds of output control signals of the first and second temperature detection circuits are adjustably set by the EDA software development platform.

6. The chip design method using secondary development capability of EDA software according to claim 2, wherein, in the step S12, inputting at least one temperature-related parameter which is required for the environment comprises: removing the frame of the completed chip design, and in the step S13, calling the function module corresponding to temperature compensation to be added to the completed chip design and drawing the corresponding schematic diagram and the layout comprises: calculating a safe voltage difference between a peripheral heating circuit and a circuit within the frame that has been removed by the EDA software development platform.

7. The chip design method using secondary development capability of EDA software according to claim 2, wherein the temperature-related parameter which is required for the environment inputted in the step S12 comprises: a maximum size limited by chip packaging, and in the step S13, using the maximum size limited by chip packaging as a range constraint by the EDA software development platform to add the function module corresponding to temperature compensation and draw a schematic diagram and a layout.

8. The chip design method using secondary development capability of EDA software according to claim 1, wherein, in the step S23, when electromagnetic shielding is done by addition of a metal layer, calling the function module corresponding to electromagnetic shielding to be added to the completed chip design comprises:

calculating a thickness of a required metal layer according to the environmental parameter related to electromagnetic field intensity, and in combination with the frame size and coordinates of the completed chip design, obtaining a size and coordinates of a metal layer covering an entire surface of a chip, the metal layer being a polygon; and according to the obtained size and coordinates of the metal layer covering the entire surface of the chip, adding an grounded loop island at a bottom layer around the perimeter of the completed chip design and starting growth until the metal layer is closed at the top so that the completed chip design is completely covered by the metal layer, wherein the metal layer at the top is left with openings at locations corresponding to chip contacts, and each face of the polygonal metal layer is grounded.

9. The chip design method using secondary development capability of EDA software according to claim 8, wherein, according to the obtained size and coordinates of the metal layer covering the entire surface of the chip, adding the grounded loop island at the bottom layer around the perimeter of the completed chip design and starting growth until the metal layer is closed at the top so that the completed chip design is completely covered by the metal layer comprises:

performing a logical operation extending a certain width for the windows corresponding to the chip contacts and located on the metal layer at the top, so that the metal layer with the openings and covering the entire chip is obtained, wherein the positions and sizes of the openings are one-to-one corresponding to the positions and sizes of the contacts.

* * * * *